United States Patent [19]

Doering

[11] E Patent Number: Re. 32,551

[45] Reissued Date of Patent: Dec. 1, 1987

[54] PUSHED DETHATCHING UNIT

[75] Inventor: Charles W. Doering, Louisville, Ky.

[73] Assignee: Brinly-Hardy Co., Inc., Louisville, Ky.

[21] Appl. No.: 513,821

[22] Filed: Jul. 15, 1983

Related U.S. Patent Documents

Reissue of:

[64] Patent No.: 4,317,327
Issued: Mar. 2, 1982
Appl. No.: 189,030
Filed: Sep. 22, 1980

[51] Int. Cl.[4] ..... A01D 7/06; A01D 76/00

[52] U.S. Cl. ..... 56/396; 56/375; 56/400; 172/622; 172/707

[58] Field of Search ..... 56/400; 172/705, 707, 172/711, 622

[56] References Cited

U.S. PATENT DOCUMENTS

| | | | |
|---|---|---|---|
| 444,609 | 1/1891 | Hallock | 172/643 |
| 1,155,192 | 9/1915 | Anderson | 172/389 |
| 1,349,809 | 8/1920 | Bronnum | 56/249 |
| 2,143,402 | 1/1939 | Baker | 56/249 |
| 2,157,620 | 5/1939 | McGrath et al. | 56/294 |
| 2,328,121 | 8/1943 | Bartek | 56/400 |
| 2,432,653 | 12/1947 | Bloom | 56/400 |
| 2,476,526 | 7/1949 | Badlat | 56/14.4 |
| 2,502,769 | 4/1950 | Warnke | 56/400 |
| 2,634,650 | 4/1953 | Coop | 85/9 |
| 2,708,863 | 5/1955 | Stuart et al. | 64/30 |
| 2,729,134 | 1/1956 | Stanton et al. | 85/61 |
| 2,751,741 | 6/1956 | Carson | 56/400 |
| 2,797,564 | 7/1957 | Bonneau et al. | 64/29 |
| 2,851,758 | 9/1958 | Troeger et al. | 24/279 |
| 2,919,602 | 1/1960 | Spraragen | 74/553 |

(List continued on next page.)

FOREIGN PATENT DOCUMENTS

| | | |
|---|---|---|
| 2112587 | of 1973 | Fed. Rep. of Germany . |
| 1079365 | of 1967 | United Kingdom . |
| 1339102 | of 1973 | United Kingdom . |
| 1472120 | of 1977 | United Kingdom . |

OTHER PUBLICATIONS

Brochure, Turf Comb for Finer Putting Greens, Carson 3-15-65.

Hutchins, Frank B. Affidavit of; second embodiment of U.S. Patent 3,646,736.

*Primary Examiner*—Paul J. Hirsch

*Attorney, Agent, or Firm*—Frank C. Leach, Jr.

[57] ABSTRACT

A dethatching unit is mounted for attachment to the front end of a self-propelled lawn mower, for example, so that the dethatching unit is pushed by the lawn mower and thatches the ground prior to mowing thereof. The dethatching unit includes a frame having a caster wheel at its forward end and arms at its rear end for attaching to the mower. The wheel and the arms cooperate so that tines, which are mounted in two rows on the frame, do not carry any of the weight of the unit so that the bottom tip of each of the tines is slightly spaced from the ground in its rest position. Each of the tines in each of the rows is offset from each of the tines in the other row. Forward motion of the dethatching unit causes the bottom tip of each of the tines to deflect rearwardly and downwardly as it comes in contact with grass. In their deflected positions, the bottom tips of the tines contact the thatch layer to tear it loose from the soil and ultimately flip the thatched material to fall on the ground. This leaves the thatched material loose for the vacuum effect of a mower to pick up and collect in a bag. The flipping or release action of the tines occurs periodically as the caster wheel runs over grass clumps or uneven ground. If desired, this release action can be controlled by use of a non-circular wheel.

* * * * *

The questions raised in reexamination request No. 90/000,405, filed 06/20/83, have been considered and the results thereof are reflected in this reissue patent which constitutes the reexamination certificate required by 35 U.S.C. 307 as provided in 37 CFR 1.570(e).

60 Claims, 7 Drawing Figures

U.S. PATENT DOCUMENTS

| | | | |
|---|---|---|---|
| 2,984,133 | 5/1961 | Livermont et al. | 81/52.4 |
| 3,024,587 | 3/1962 | Warnke | 56/14.4 |
| 3,191,486 | 6/1965 | Gibbens | 85/61 |
| 3,478,500 | 11/1969 | Rhoads | 56/400 |
| 3,552,147 | 1/1971 | Johansson et al. | 64/29 |
| 3,640,141 | 2/1972 | Hollingsead | 74/89.15 |
| 3,646,736 | 3/1972 | Hutchins | 56/16.9 |
| 3,657,866 | 4/1972 | Burroughs | 56/15.5 |
| 3,765,159 | 10/1973 | Neff | 56/400 |
| 3,859,777 | 1/1975 | Doering | 56/400 |
| 4,009,560 | 3/1977 | Wells | 56/400.01 |
| 4,018,091 | 4/1977 | Hollingsead | 74/89.15 |
| 4,129,977 | 12/1978 | Comer | 56/400 |
| 4,146,096 | 3/1979 | Rocker | 172/643 |
| 4,151,701 | 5/1979 | Marto | 56/396 |
| 4,256,185 | 3/1981 | Dockworth | 56/400 |
| 4,534,234 | 8/1985 | Cosenza | 74/89.15 |

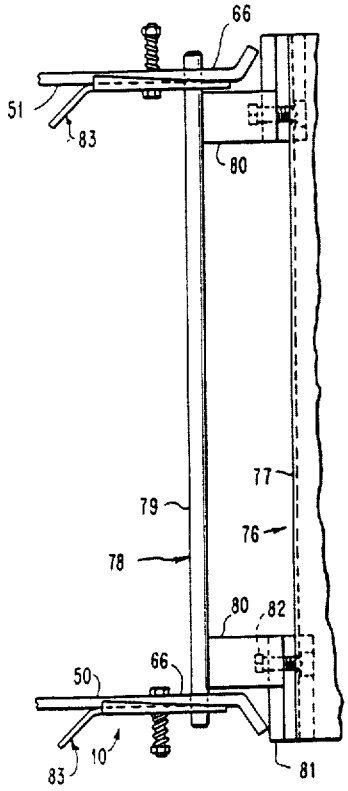
FIG. 3
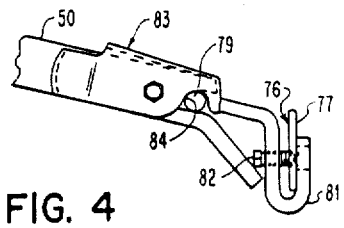
FIG. 4
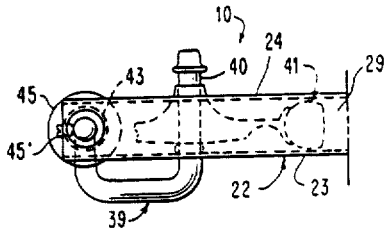
FIG. 1B
| FIG. 1B | FIG. 1A |
|---|---|
FIG. 1
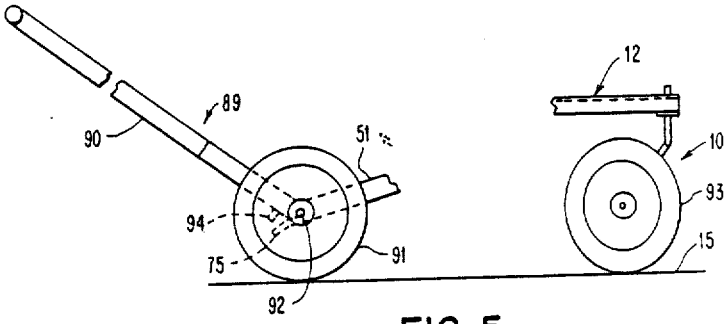
FIG. 5

PUSHED DETHATCHING UNIT

Matter enclosed in heavy brackets [ ] appears in the original patent but forms no part of this reissue specification; matter printed in italics indicates the additions made by reissue.

In U.S. Pat No. 4,146,096 to Rocker, there is shown a dethatching unit adapted to be pulled by a motive vehicle. The dethatching unit of the aforesaid Rocker patent requires the tines to carry weight so that the tines will penetrate the ground. Thus, the aforesaid Rocker patent seeks to have the tines engage the ground when thatching and to carry weight of the frame on the tines to insure that the tines engage the ground. When at rest, each of the tines of the aforesaid Rocker patent has an upper portion extending slightly forwardly of the vertical and a lower portion extending forwardly of the upper portion.

Another pulled dethatching unit is shown in U.S. Pat. No. 3,756,159 to Neff. The dethatching unit of the aforesaid Neff patent has each of its tines arranged so that its upper portion extends rearwardly and the lower ground engaging portion is vertical in one position. In another position, each of the tines of the dethatching unit of the aforesaid Neff patent has its upper portion extend vertically and the lower ground engaging portion extend forwardly of the upper portion.

In the aforesaid Neff patent, a wheel supports the rear end of the frame of the unit. The tines of the aforesaid Neff patent also carry weight of the frame to insure that the tines penetrate the ground.

The dethatching units of the aforesaid Rocker and Neff patents have the disadvantage of requiring pulling of the dethatching unit on the rear of a self-propelled vehicle. They also require a substantial propelling force from the self-propelled vehicle because the tines are disposed in the ground when at rest.

Because the dethatching unit of each of the aforesaid Rocker and Neff patents is disposed rearwardly of the motive vehicle, there is no suggestion in either of the aforesaid Rocker or Neff patent of being able to pick up the thatch during the same pass as when the thatch is removed and to mow the ground, if desired. Instead, the dethatching unit of each of the aforesaid Rocker and Neff patents requires a separate operation to pick up the thatch from when the thatch is removed with this pick up of the thatch occurring at the same time as mowing, if mowing is desired, when the mower has a bag to collect the thatch.

The dethatching unit of the present invention satisfactorily overcomes the foregoing problems through being capable of being pushed by a mower having a collecting bag. This enables removal of the thatched material and then mowing, if desired, during the same pass over the ground with the thatched material being picked up into the bag of the mower along with the mowed grass, if the grass is mowed, during the same pass.

The dethatching unit of the present invention does not require a substantial force to push it because the tines are disposed above the ground when at rest. Furthermore, even though the tines slightly penetrate into the ground when deflected, they do not carry any weight of the frame as in the aforesaid Rocker and Neff patents whereby the substantial force required by each of the dethatching units of the aforesaid Rocker and Neff patents to propel the dethatching unit is avoided.

The dethatching unit of the present invention is preferably utilized with a self-propelled lawn mower. The propelling force of the self-propelled lawn mower is capable of pushing the dethatching unit of the present invention.

The dethatching unit of the present invention also can be employed with a riding mower, which is a small tractor having mower blades beneath it, or a separate tractor and mower. Furthermore, because of the relatively small propelling force required, the dethatching unit of the present invention can be employed, if desired, with a mower that is not self propelled or with a wheeled structure without any mower. However, it is preferred to be used with a self-propelled mower and is capable of such without overloading the motor of the self-propelled mower.

An object of this invention is to provide a dethatching unit adapted to be pushed.

Another object of this invention is to provide a dethatching unit that is easily attachable to a lawn mower or the like.

A further object of this invention is to provide a dethatching unit in which dethatching tines have their bottom ends above the ground when at rest.

Still another object of this invention is to provide a dethatching unit requiring small propelling force.

Other objects of this invention will be readily perceived from the following description, claims, and drawings.

This invention relates to a pushed dethatching unit including frame means having wheel means supported adjacent its front end to support the frame means. The frame means has at least one row of tines mounted thereon with each of the tines in each of the rows being non-rotary. When there is more than one of the rows of the tines, each of the tines in each of the rows of the tines is offset in the direction of motion of the dethatching unit from each of the tines in each of the other rows of the tines. Each of the tines has a lower portion for engaging the material to be thatched. Support means is supported adjacent the rear end of the frame means to attach the frame means to pushing means to enable pushing of the dethatching unit by the pushing means. The support means and the wheel means cooperate to suspend the bottom tip of the lower portion of each of the tines above the ground so that no weight is applied to any of the tines when the dethatching unit is at rest. Each of the tines has the bottom tip of the lower portion beneath the point of attachment of the support means to the pushing means at all times.

The attached drawings illustrate preferred embodiments of the invention, in which:

FIG. 1 is a block diagram showing the arrangement of FIGS. 1A and 1B;

FIGS. 1A and 1B are top plan views of a dethatching unit of the present invention attached to a self-propelled lawn mower having a curved front housing;

FIG. 3 is a fragmentary top plan view of the rear portion of the dethatching unit of FIG. 1 and showing a mounting arrangement for attaching the dethatching unit to a self-propelled lawn mower having a flat front housing;

FIG. 4 is a fragmentary side elevational view of the portion of the dethatching unit of FIG. 3 and its attachment to the self-propelled lawn mower having a flat front housing; and FIG. 5 is a fragmentary side elevational view of a portion of the dethatching unit of FIG. 1 and showing another arrangement for pushing the dethatching unit.

Figure 1A:
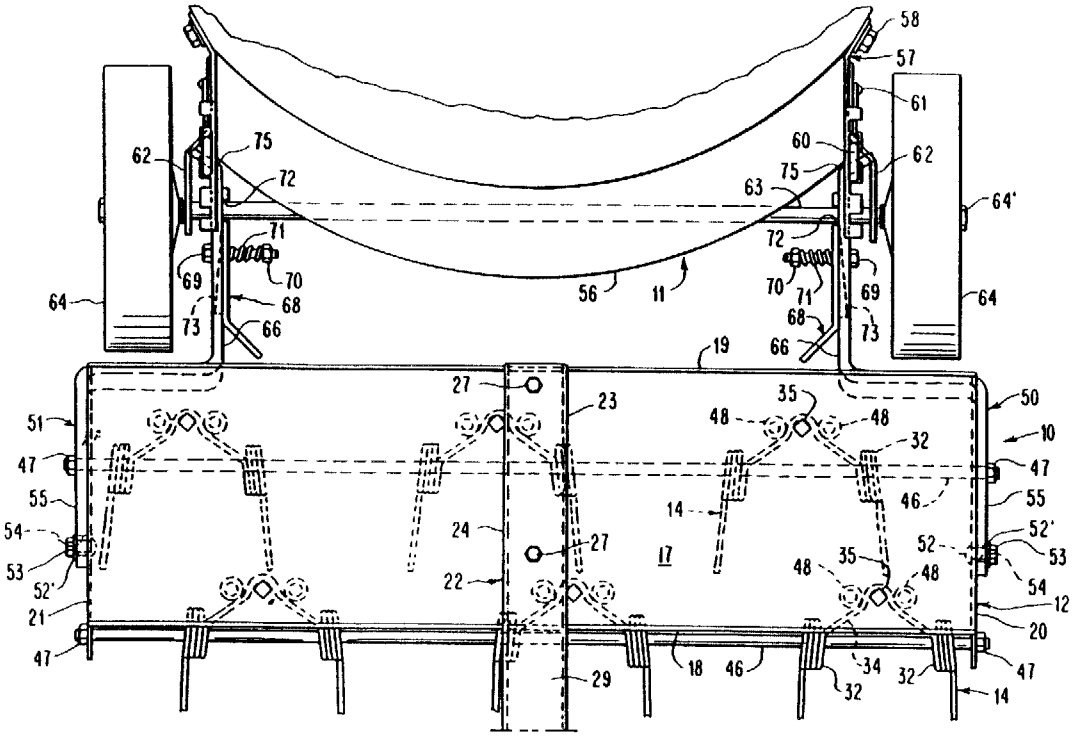
Figure 2:
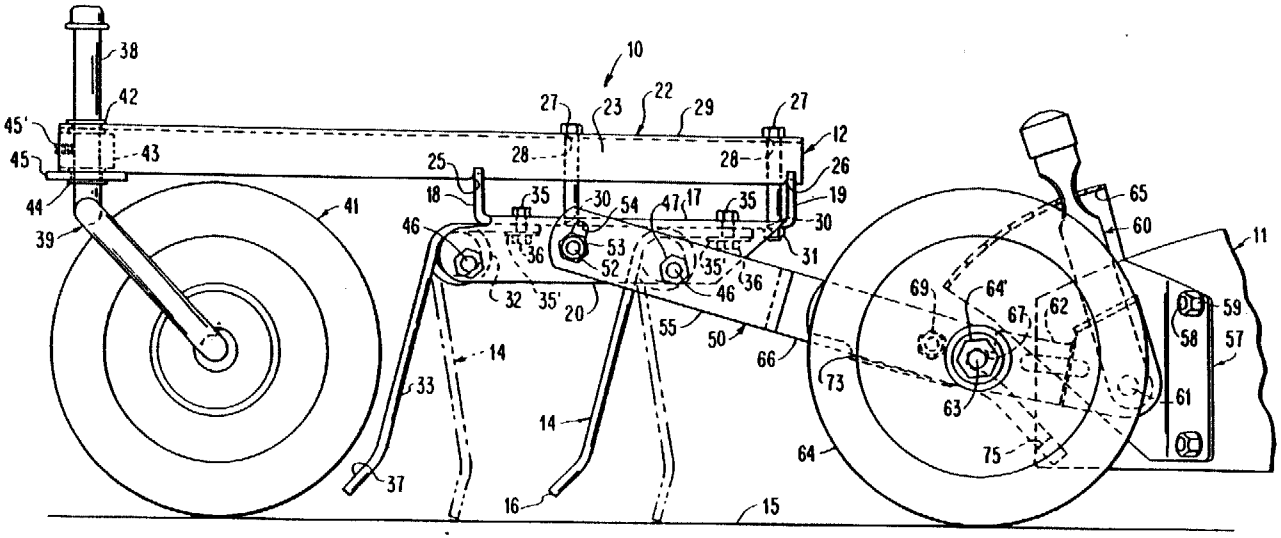
FIG. 2 is a side elevational view of the dethatching unit of FIG. 1 attached to the self-propelled lawn mower.

Referring to the drawings and particularly FIGS. 1A, 1B, and 2, there is shown a dethatching unit 10 for attachment to a self-propelled lawn mower 11. The dethatching unit 10 includes a frame 12 supporting tines 14 in two substantially parallel rows for engaging material in ground 15 to remove the material. Each of the tines 14 has its bottom tip or end 16 spaced approximately one-fourth inch to one-half inch from the ground 15 when the tine 14 is in its rest position.

The frame 12 includes a substantially flat, horizontally disposed plate 17 having a front wall 18 and a rear wall 19 extending upwardly therefrom and substantially perpendicular thereto. The plate 17 has substantially parallel side walls 20 and 21 extending downwardly therefrom and substantially perpendicular thereto.

The frame 12 also includes a U-shaped support 22 disposed above the plate 17 and attached thereto. The U-shaped support 22 has each of its downwardly depending side walls 23 and 24 formed with a pair of semi-circular slots 25 and 26 (shown only for the side wall 23 in FIG. 2) to receive cooperating semi-circular slots (not shown) in each of the front wall 18 and the rear wall 19, respectively, of the plate 17. Thus, a nesting relation exists between the plate 17 and the U-shaped support 22 when secured to each other to form the frame 12.

A pair of bolts 27 extends through openings 28 (see FIG. 2) in a top wall 29 of the U-shaped support 22 and through openings 30 in the plate 17. A nut 31 cooperates with each of the bolts 27 to secure the plate 17 to the U-shaped support 22 to form the frame 12.

As shown in FIG. 1A, each of the adjacent pair of the tines 14 in the same row is integral with each other. Each of the tines 14 includes a coiled portion 32 extending substantially horizontally from an upper portion 33 (see FIG. 2) of the tine 14. The coiled portions 32 of the integral adjacent pair of the tines 14 have a connecting portion 34 (see FIG. 1A) extending therebetween with the connecting portion 34 being secured to the plate 17 by a bolt 35, a washer 35' (see FIG. 2), and a nut 36.

The tines 14 are mounted on the plate 17 of the frame 12 so that tine 14 in any of the rows (There are two of the rows of the tines 14 shown in FIG. [1] *1A* but there could be one row or more than two, if desired.) is offset from each of the tines 14 in any of the other rows. Thus, when one of the tines 14 strikes material to be thatched and has moved rearwardly to the dotted line position of FIG. 2, for example, the tine 14 will not strike any of the tines 14 in the adjacent rearward row. This staggered pattern of the tines 14 also aids passage of the thatched material through the tines 14 and to the mower 11 for pick up.

Each of the tines 14 includes a lower portion 37, which engages the material to be thatched, extending forwardly at an angle from the upper portion 33. The upper portion 33 is preferably disposed 15° forwardly of the vertical while the lower portion 37 is disposed 45° forwardly of the vertical and 30° forwardly of the upper portion 33.

Each of the tines 14 is preferably of a diameter in a range of ⅛" to 5/32". The length of the lower portion 37 of each of the tines 14 is preferably about 1⅜" while the length of the upper portion 33 from the lower portion 37 to the coiled portion 32 is preferably about 4¾".

The forward end of the U-shaped support 22 has a vertical portion 38 of a wheel support element 39 adjustably supported therein. The element 39 has a horizontal portion 40 (see FIG. 1B) on which a wheel 41 is rotatably supported. The vertical portion 38 is rotatably supported by the U-shaped support 22 so that the wheel 41 functions as a caster wheel.

The vertical portion 38 of the wheel support element 39 passes through a split ring nylon bearing 42 (see FIG. 2), which is mounted in an opening in the top wall 29 of the U-shaped support 22, a locking collar 43, and a split ring nylon bearing 44, which is mounted in a washer 45 attached to the bottom of each of the side walls 23 and 24 (see FIG. 1B) of the U-shaped support 22 by suitable means such as welding, for example. A set screw 45' attaches the locking collar 43 to the vertical portion 38 (see FIG. 2) of the wheel support element 39. Through releasing the set screw 45', the position of the wheel 41 can be adjusted vertically relative to the frame 12 to position the bottom tip 16 of each of the tines 14 above the ground 15 at the desired distance.

As shown in FIG. 1A, a rod 46 extends through the coiled portion 32 of each of the tines 14 of the forward row and through aligned openings in the side walls 20 and 21 of the plate 17 of the frame 12. Each end of the rod 46 is threaded to receive a locking nut 47.

The rod 46 is substantially smaller in diameter than the diameter of the coiled portion 32 of each of the tines 14 and is positioned adjacent the lower portion of each of the coiled portions 32 to enable the tine 14 to bend backwardly to the dotted line position of FIG. 2. The rod 46 prevents any of the tines 14 from flying loose if the tine 14 should break so as to no longer be secured by the bolt 35 and the nut 36.

It should be understood that the plate 17 has a depressed portion 48 (see FIG. 1A), which is like a button, adjacent the connecting portion 34 on each side of the bolt 35. As shown in FIG. 1A, the centers of the depressed portions 48 are aligned with the centers of the openings for the bolts 35.

Another of the rods 46 is positioned within the coiled portion 32 of each of the tines 14 of the rear row of the tines 14. The rod 46 extends through aligned openings in the side walls 20 and 21 of the plate 17 in the same manner as the rod 46 for the front row of the tines 14. The rod 46 has each end threaded to receive one of the locking nuts 47.

The rod 46 for the back row of the tines 14 also extends through an opening in each of a pair of arms 50 and 51 to provide a pivot for each of the arms 50 and 51. Each of the arms 50 and 51 is secured to the side walls 20 and 21, respectively, of the plate 17 by a carriage bolt 52, a washer 52', and a nut 53 with each of the carriage bolts 52 extending through an opening in the side wall 20 or 21 of the plate 17 and an elongated slot 54 in a portion 55 of the adjacent arm 50 or 51. This enables pivoting of the arms 50 and 51 about the rod 46 for the back row of the tines 14.

In combination with the vertical adjustment of the wheel 41 (see FIG. 2) relative to the frame 12, the adjustment of the arms 50 and 51 (see FIG. 1A) through the elongted slots 54 allows both leveling and height control of the tines 14 in the longitudinal direction. By adjusting one of the arms 50 and 51 more than the other relative to the slots 54, height adjustment of the tines 14 is obtained in the lateral direction.

The arms 50 and 51 attach the dethatching unit 10 to the mower 11. The mower 11, which is shown in FIGS. 1A and 2, is manufactured by McDonough Power Equipment, McDonough, Ga. as model number Snapper-21500PC.

The mower 11 includes a curved front housing 56 (see FIG. 1A) having a detent bracket 57 (see FIG. 2) attached on each side thereof by bolts 58 and 59. Each of the detent brackets 57 has a mower height adjusting tab 60 pivotally mounted thereon by a pivot pin 61 with each of the tabs 60 having a portion 62 supporting a front axle 63 of the mower 11. Each end of the front axle 63 has a wheel 64 rotatably supported thereon and retained thereon by a nut 64'. Accordingly, by positioning each of the tabs 60 in one of a plurality of detents 65 in each of the detent brackets 57, the position of the mower 11 can be raised or lowered relative to the ground 15.

Each of the arms 50 (see FIG. 1A) and 51 of the dethatching unit 10 has a rearwardly extending portion 66 for cooperation with the front axle 63 of the mower 11 through each of the portions 66 having a slot 67 (see FIG. 2) in its end to receive the front axle 63 in the mower 11. The portion 66 of each of the arms 50 and 51 (see FIG. 1A) has a quick attach latch 68 pivotally mounted thereon by a bolt 69 and a nut 70. A spring 71, which extends between the nut 70 and a surface of the latch 68, continuously urges the latch 68 against the portion 66 of each of the arms 50 and 51.

Each of the latches 68 has a slot 72 formed in its upper surface to receive the front axle 63 of the mower 11. After the slot 72 in each of the latches 68 has received the front axle 63, each of the latches 68 is pivoted about the mounting bolt 69 until a locking tab 73 is disposed beneath the portion 66 of the arm 50 or 51 on which the latch 68 is pivotally mounted. The spring 71 continuously urges the latch 68 to the position in which the locking tab 73 is beneath the portion 66 of the arm 50 or 51. Thus, the locking tab 73 retains the latch 68 to hold the dethatching unit 10 on the front axle 63 of the mower 11.

The rearwardly extending portion 66 of each of the arms 50 and 51 has a stop 75 extending beneath the portion 62 of the tab 60 on the same side of the mower 11 as the portion 66 is disposed. Therefore, when the mower 11 has its front end raised to turn as is necessary for a self-propelled mower, the stops 75 prevent the tines 14 from moving back into the blades (not shown) of the mower 11. Accordingly, the stops 75 insure that the dethatching unit 10 also is raised after a predetermined amount of raising of the front end of the mower 11 occurs for turning purposes.

While the dethatching unit 10 has been shown and described as being utilized with the mower 11 having the curved front housing 56, it should be understood that the dethatching unit 10 may be utilized with any type of mower. For example, a mower 76 (see FIGS. 3 and 4) with a flat front housing 77 could be used. With the mower 76, it is necessary to provide a universal mounting 78 because of the flat front housing 77.

The universal mounting 78 includes a rod 79 having brackets 80 welded thereto adjacent opposite ends thereof and inside of the arms 50 and 51 of the dethatching unit 10. Each of the brackets 80 has a U-shaped portion 81 (see FIG. 4) to receive the front wall of the flat front housing 77 of the mower 76 between its legs. A tapping screw 82 extends through the U-shaped portion 81 and the flat front housing 77 to attach the universal mounting 78 to the mower 76.

Each of the latches 68 (see FIG. 1A) is replaced by a latch 83 (see FIGS. 3 and 4), which is mounted on the rearwardly extending portion 66 of each of the arms 50 and 51 in the same manner as the latch 68 (see FIG. 1A). The latch 83 (see FIGS. 3 and 4) has a slot 84 to receive the rod 79 of the universal mounting 78. Thus, in this arrangement, the dethatching unit 10 is mounted on the rod 79 of the universal mounting 78 rather than on the front axle of the mower 76 because the flat front housing 77 prevents access to the front axle of the mower 76.

While the dethatching unit 10 has been shown and described as being utilized with the mower 11 (see FIG. 1A) or the mower 76 (see FIG. 3), it should be understood that the dethatching unit 10 may be utilized with any other suitable pushing means. Thus, as shown in FIG. 5, the dethatching unit 10 may be pushed by pushing means 89 including a handle 90 and a pair of wheels 91 rotatably supported on an axle 92. The handle 90 is preferably formed of a pair of tubes secured to each other except along the lower portions where the tubes are spaced from each other to form bifurcated portions of the handle 90. The axle 92 is supported by the bifurcated portions of the handle 90, preferably adjacent each of the wheels 91.

The axle 92 is disposed in the slot 67 (see FIG. 2) in the rearwardly extending portion 66 of each of the arms 50 and 51 of the dethatching unit 10. The axle 92 (see FIG. 5) is retained in the slots 67 (see FIG. 2) by the latches 68 in the manner previously described for retaining the axle 63 of the mower 11 in the slots 67.

As shown in FIG. 5, a caster wheel 93, which is used instead of the wheel 41 (see FIG. 2), has an elliptical periphery. This provides a rapid up and down motion to the tines 14 to provide a more aggressive action of the tines 14 than is obtained by reliance solely upon the variation of the terrain of the ground 15 as occurs with the round wheel 41. It should be understood that the wheel 93 (see FIG. 5) could have any other non-round or non-circular periphery such as hexagonal or octagonal, for example.

Each of the bifurcated portions of the handle 90 has a stop 94 secured thereto for cooperation with the stop 75 on the rearwardly extending portion 66 of each of the arms 50 (see FIG. 1A) and 51. This insures that the dethatching unit 10 is raised after a predetermined amount of raising of the pushing means 89 (see FIG. 5).

While the dethatching unit 10 has been shown and described as having the periphery of the wheel 41 (see FIG. 2) round so that the tines 14 are released after engaging material to be thatched and being moved rearwardly because of variations in the terrain of the ground 15, it should be understood that the dethatching unit 10 of FIGS. 1 and 3 could have the wheel 93 (see FIG. 5) instead of the wheel 41 (see FIG. 2) if desired. Likewise, the embodiment of FIG. 5 could use the round wheel 41 if desired.

*In accordance then, with one embodiment of the invention, a dethatching unit is mounted for attachment to the front end of a self-propelled lawn mower, for example, so that the dethatching unit is pushed by the lawn mower and thatches the ground prior to mowing thereof. The dethatching unit includes a frame having a caster wheel at its forward end and arms at its rear end for attaching to the mower. The wheel and the arms cooperate so that tines, which are mounted in two rows on the frame, do not carry*

*any of the weight of the unit so that the bottom tip of each of the tines is slightly spaced from the ground in its rest position. Each of the tines in each of the rows is offset from each of the tines in the other row. Forward motion of the dethatching unit causes the bottom tip of each of the tines to deflect rearwardly and downwardly as it comes in contact with grass. In their deflected positions, the bottom tips of the tines contact the thatch layer to tear it loose from the soil and ultimately flip the thatched material to fall on the ground. This leaves the thatched material loose for the vacuum effect of a mower to pick up and collect in a bag. The flipping or release action of the tines occurs periodically as the caster wheel runs over grass clumps or uneven ground. If desired, this release action can be controlled by use of a non-circular wheel.*

*As used, then, in this specification and appended claim 1, the phrase "pushed dethatching unit," when used together with other components and elements of such a unit as noted in claim 1, means apparatus including a pushed dethatching unit operable to remove thatch material from a layer of thatch on the ground and wherein tines are mounted thereon normally above the ground when the unit is at rest and have bottom tips deflected downwardly and rearwardly from their rest position above the ground, upon and by engagement with grass when the dethatching unit is moved forwardly, so that the deflected tips come into contact with material to be thatched, and the tines, upon further forward movement of the dethatching unit, flip the contacted thatch material away from a layer of thatch for removal.*

An advantage of this invention is that no weight must be added to the tines to obtain thatching. Another advantage of this invention is that it is not necessary to make separate passes to both thatch the material and pick up the removed thatched material. A further advantage of this invention is that is may be easily attached to and removed from a self-propelled lawn mower.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A pushed dethatching unit *for removing thatch material from a layer of thatch and* including:

frame means;

wheel means supported adjacent the front end of said frame means to support said frame means;

said frame means having at least one row of tines mounted thereon, each of said tines in each of said rows being non-rotary;

each of said tines in each of said rows of said tines being offset in the direction of motion of said dethatching unit from each of said tines in each of said other rows of said tines when there is more than one of said rows of said tines;

each of said tines having a lower portion *terminating in a tip* for engaging the material to be thatched;

and support means supported adjacent the rear end of said frame means to attach said frame means to pushing means to enable pushing of said dethatching unit by the pushing means, said support means and said wheel means cooperating to suspend the [bottom] tip of said lower portion of each of said tines above the ground so that no weight is applied to any of said tines when said dethatching unit is at rest, and each of said tines having the [bottom] tip of said lower portion beneath the point of attachment of said support means to the pushing means at all times[.];

*said tines extending downwardly and forwardly from said frame means with each said tip disposed above the ground such that forward motion of said pushed dethatching unit causes said tine tips to deflect downwardly and rearwardly, upon contact with grass, and into contact with thatch material to tear contacted material loose from a layer of thatch.*

2. The pushed dethatching unit according to claim 1 in which said support means includes cooperating means to prevent said dethatching unit from moving into engagement with the pushing means when said dethatching unit is lifted for turning the pushing means.

3. The pushed dethatching unit according to claim 2 in which:

each of said tines has *an upper portion and* a coiled portion connected to said upper portion;

connecting means to connect said coiled portion of each adjacent pair of said tines to each other;

means to attach said connecting means to said frame means;

and means supported by said frame means and extending through said coiled portion of each of said tines in each of said rows to catch said tine if it breaks.

4. The pushed dethatching unit according to claim 3 including:

means to vertically adjust said wheel means relative to said frame means;

and means to adjust the position of said support means relative to said frame means to adjust the plane of the [bottom] tip of said lower portion of each of said tines.

5. The pushed dethatching unit according to claim 1 in which said support means includes:

extending means extending rearwardly from each side of said frame means;

and means supported on said extending means for releasably connecting said dethatching unit to the pushing means.

6. The pushed dethatching unit according to claim 5 including means to adjust the position of said extending means relative to said frame means to adjust the plane of the [bottom] tip of said lower portion of each of said tines.

7. The pushed dethatching unit according to claim 6 including means to vertically adjust said wheel means relative to said frame means.

8. The pushed dethatching unit according to claim 5 in which:

each of said tines has *an upper portion and* a coiled portion connected to said upper portion;

connecting means to connect said coiled portion of each adjacent pair of said tines to each other;

means to attach said connecting means to said frame means;

and means supported by said frame means and extending through said coiled portion of each of said tines in each of said rows to catch said tine if it breaks.

9. The pushed dethatching unit according to claim 1 in which said frame means includes:

first means having each of said tines mounted thereon;

and second means secured to said first means and having said wheel means mounted thereon.

10. The pushed dethatching unit according to claim 1 in which said wheel means includes a single caster wheel supported by said frame means.

11. The pushed dethatching unit according to claim 1 in which each of said tines has an upper portion and said lower portion is inclined forwardly of said upper portion at least when said tine is at rest.

12. The pushed dethatching unit according to claim 1 in which:

said frame means includes:

upper frame means;

lower frame means;

means to connect said lower frame means to said upper frame means in suspended relation thereto;

said upper frame means supporting said wheel means;

said lower frame means having said tines mounted thereon;

and said support means being supported by said lower frame means.

13. The pushed dethatching unit according to claim 12 including:

means to vertically adjust said wheel means relative to said upper frame means;

and means to adjust the position of said support means relative to said lower frame means to adjust the plane of the [bottom] tip of said lower portion of each of said tines.

14. The pushed dethatching unit according to claim 13 in which said wheel means includes a single caster wheel supported by said upper frame means.

15. The pushed dethatching unit according to claim 12 in which said support means includes:

extending means extending rearwardly from each side of said lower frame means;

and means supported on said extending means for releasably connecting said dethatching unit to the pushing means.

16. The pushed dethatching unit according to claim 15 in which:

said extending means includes a pair of arms;

each of said arms includes said supported means of said support means;

means to pivotally connect each of said arms to said lower frame means for independent pivoting;

and means to lock each of said arms separately in any position to which said arm is pivoted to adjust the plane of the [bottom] tip of said lower portion of each of said tines.

17. The pushed dethatching unit according to claim 16 in which:

each of said tines has *an upper portion and* a coiled portion connected to said upper portion;

connecting means to connect said coiled portion of each adjacent pair of said tines to each other;

means to attach said connecting means to said lower frame means;

catching means supported by said lower frame means and extending through said coiled portion of each of said tines in each of said rows to catch said tine if it breaks;

and said catching means for one of said rows of said tines includes said pivoting means for said arms.

18. The pushed dethatching unit according to claim 12 in which each of said tines has an upper portion and said lower portion is inclined forwardly of said upper portion at least when said tine is at rest.

*19. The pushed dethatching unit according to claim 1 in which:*

*each of said tines has a coiled portion adjacent said frame means;*

*said catching means supported by said frame and extending through said coiled portion of each of said tines to catch said tine if it breaks.*

*20. The pushed dethatching unit according to claim 5 in which:*

*each of said tines has a coiled portion adjacent said frame means;*

*and catching means supported by said frame means and extending through said coiled portion of each of said tines to catch said tine if it breaks.*

*21. The pushed dethatching unit according to claim 1 in which each of said tines has its tip rearwardly of the engagement of said wheel means with the ground when said dethatching unit is at rest.*

*22. The pushed dethatching unit according to claim 5 in which each of said tines has its tip rearwardly of the engagement of said wheel means with the ground when said dethatching unit is at rest.*

*23. The pushed dethatching unit according to claim 1 in which:*

*each of a plurality of said tines has its tip in a single row;*

*and each of said tines having its tip in the single row is movable downwardly and rearwardly from its rest position for engaging the material to be thatched.*

*24. The pushed dethatching unit according to claim 23 in which each of said tines movable downwardly and rearwardly has an upper portion and said lower portion is inclined forwardly of said upper portion at least when said tine is at rest.*

*25. The pushed dethatching unit according to claim 5 in which:*

*each of a plurality of said tines has its tip in a single row;* and each of said tines having its tip in the single row is movable downwardly and rearwardly from its rest position for engaging the material to be thatched.

*26. The pushed dethatching unit according to claim 25 in which each of said tines movable downwardly and rearwardly has an upper portion and said lower portion is inclined forwardly of said upper portion at least when said tine is at rest.*

*27. The pushed dethatching unit according to claim 12 in which:*

*each of said tines has a coiled portion adjacent said lower frame means;*

*and catching means supported by said lower frame means and extending through said coiled portion of each of said tines to catch said tine if it breaks.*

*28. The pushed dethatching unit according to claim 13 in which:*

*each of said tines has a coiled portion adjacent said lower frame means;*

*and catching means supported by said lower frame means and extending through said coiled portion of each of said tines to catch said tine if it breaks.*

*29. The pushed dethatching unit according to claim 16 in which:*

*each of said tines has a coiled portion adjacent said lower frame means;*

*and catching means supported by said lower frame means and extending through said coiled portion of each of said tines to catch said tine if it breaks.*

*30. The pushed dethatching unit according to claim 29 including:*

*a plurality of rows of said tines;*

*and said catching means for one of said rows of said tines includes said pivoting means for said arms.*

*31. The pushed dethatching unit according to claim 1 in which said support means supported on said frame means is separate from said frame means.*

*32. The pushed dethatching unit according to claim 5 in which:*

*each of said extending means is separate from said lower frame means;*

*and said supported means supported on said extending means is supported solely on said extending means.*

*33. The pushed dethatching unit according to claim 1 in which said support means includes:*

*extending means extending rearwardly from each side of said frame means;*

*and latch means supported solely on said extending means for releasably connecting said dethatching unit to the pushing means.*

*34. The pushed dethatching unit according to claim 12 in which said support means includes:*

*extending means extending rearwardly from each side of said lower frame means;*

*and latch means supported solely on said extending means for releasably connecting said dethatching unit to the pushing means.*

*35. A pushed dethatching unit for removing thatch material from a layer of thatch and including:*

*frame means;*

*wheel means supported adjacent the front end of said frame means to support said frame means;*

*said frame means having at least one row of tines mounted thereon, each of said tines being mounted for movement independently of each of the other of said tines;*

*each of said tines having a lower portion terminating in a tip for engaging the material to be thatched;*

*and support means supported adjacent the rear end of said frame means to attach said frame means to pushing means to enable pushing of said dethatching unit by the pushing means, said lower portion of each of said tines having its tip above the ground so that no weight is applied to any of said tines when said dethatching unit is at rest, and each of said tines having the bottom tip of said lower portion beneath the point of attachment of said support means to the pushing means at all times; said tines extending downwardly and forwardly from said frame means with each said tip portion disposed above the ground such that forward motion of said pushed dethatching unit causes said tine tip portions to deflect downwardly and rearwardly, upon contact with grass, and into contact with thatch material to tear contacted material loose from a layer of thatch.*

*36. The pushed dethatching unit according to claim 35 including:*

*said frame means having a plurality of rows of said tines mounted thereon;*

*and each of said tines in each of said rows of said tines being offset in the direction of motion of said dethatching unit from each of said tines in each of said other rows of said tines.*

*37. The pushed dethatching unit according to claim 35 including:*

*said frame means having said tines mounted thereon to dispose said tips of said tines in a plurality of rows;*

*and each of said tines having said tips in each of said rows offset in the direction of motion of said dethatching unit from each of said tines having said tips in each of said other rows of said tips.*

*38. The pushed dethatching unit according to claim 37 in which each of said tines having its tip in at least one of the plurality of rows is movable downwardly and rearwardly from its rest position for engaging the material to be thatched.*

*39. The pushed dethatching unit according to claim 35 in which each of said tines has its tip rearwardly of the engagement of said wheel means with the ground when said dethatching unit is at rest.*

*40. The pushed dethatching unit according to claim 35 in which:*

*each of said tines has a coiled portion adjacent said frame means;*

*and catching means supported by said frame means and extending through said coiled portion of each of said tines to catch said tine if it breaks.*

*41. The pushed dethatching unit according to claim 35 in which:*

*each of a plurality of said tines has its tip in a single row;*

*and each of said tines having its tip in a single row is movable downwardly and rearwardly from its rest position for engaging the material to be thatched.*

*42. The pushed dethatching unit according to claim 35 in which said frame means includes:*

*upper frame means supporting said wheel means;*

*lower frame means having said tines mounted thereon;*

*said lower frame means and said upper frame means being connected to each other;*

*and said support means being supported by said lower frame means.*

*43. The pushed dethatching unit according to claim 42 including:*

*said support means and said wheel means cooperating to suspend the bottom tip of said lower portion of each of said tines above the ground so that no weight is applied to any of said tines when said dethatching unit is at rest;*

*means to vertically adjust said wheel means relative to said upper frame means;*

*and means to adjust the position of said support means relative to said lower frame means to adjust the plane of the bottom tip of said lower portion of each of said tines.*

*44. The pushed dethatching unit according to claim 43 in which said wheel means includes a single caster wheel supported by said upper frame means.*

*45. The pushed dethatching unit according to claim 42 in which said support means includes:*

*extending means extending rearwardly from each side of said lower frame means;*

*and means supported on said extending means for releasably connecting said dethatching unit to the pushing means.*

*46. The pushed dethatching unit according to claim 45 in which:*

*said extending means includes a pair of arms;*

*each of said arms includes said supported means of said support means;*

*means to pivotally connect each of said arms to said lower frame means for independent pivoting;*

*and means to lock each of said arms separately in any position to which said arm is pivoted to adjust the plane of the bottom tip of said lower portion of each of said tines.*

*47. The pushed dethatching unit according to claim 46 in which:*

*each of said tines has a coiled portion adjacent said lower frame means;*

*and catching means supported by said lower frame means and extending through said coiled portion of each of said tines to catch said tine if it breaks.*

*48. The pushed dethatching unit according to claim 35 in which said support means includes:*

*extending means extending rearwardly from each side of said frame means;*

*and means supported on said extending means for releasably connecting said dethatching unit to the pushing means.*

*49. The pushed dethatching unit according to claim 48 including means to adjust the position of said extending means relative to said frame means to adjust the plane of the bottom tip of said lower portion of each of said tines.*

*50. The pushed dethatching unit according to claim 35 in which said support means includes cooperating means to prevent said dethatching unit from moving into engagement with the pushing means when said dethatching unit is lifted for turning the pushing means.*

*51. The pushed dethatcing unit according to claim 35 in which said support means supported on said frame means is separate from said frame means.*

*52. The pushed dethatching unit according to claim 48 in which:*

*each of said extending means is separate from said lower frame means;*

*and said supported means supported on said extending means is supported solely on said extending means.*

*53. The pushed dethatching unit according to claim 35 in which said support means includes:*

*extending means extending rearwardly from each side of said frame means;*

*and latch means supported solely on said extending means for releasably connecting said dethatching unit to the pushing means.*

*54. The pushed dethatching unit according to claim 42 in which said support means includes:*

*extending means extending rearwardly from each side of said lower frame means;*

*and latch means supported solely on said extending means for releasably connecting said dethatching unit to the pushing means.*

*55. A pushed dethatching unit for removing thatch material from a layer of thatch and including:*

*frame means;*

*wheel means for supporting said frame means;*

*said frame means having a plurality of tines mounted thereon for movement independently of each other;*

*each of said independently movable tines having a lower portion for engaging the material to be thatched;* each of said independently movable tines being movable downwardly and rearwardly from its rest position for engaging the material to be thatched;

*and attaching means for attaching said frame means to pushing means to enable pushing of said dethatching unit by the pushing means, said lower portion of each of said independently movable tines terminating in a tip disposed above the ground so that no weight is applied to any of said independently movable tines when said dethatching unit is at rest whereupon forward motion of said pushed dethatching unit causes each of said tines to deflect downwardly and rearwardly as it comes into contact with grass, so that each of said tips contacts thatch material to tear it loose and flip it away from a layer of thatch.*

*56. The pushed dethatching unit according to claim 55 in which said attaching means includes:*

*extending means extending rearwardly from said frame means;*

*and releasably connecting means supported by said extending means for releasably connecting said dethatching unit to the pushing means.*

*57. The pushed dethatching unit according to claim 56 in which:*

*said extending means includes a pair of arms;*

*each of said arms solely supporting one of said releasably connecting means;*

*means to pivotally connect each of said arms to said frame means for independent pivoting;*

*and means to lock each of said arms separately in any position to which said arm is pivoted to adjust the plane of the bottom tip of said lower portion of each of said independently movable tines.*

*58. The pushed dethatching unit according to claim 55 in which:*

*said frame means includes upper frame means and lower frame means separate from each other and connected to each other;*

*one of said lower frame means and said upper frame means is connected to said wheel means;*

*and the other of said lower frame means and said upper frame means supports said attaching means.*

*59. The pushed dethatching unit according to claim 55 in which said support means includes:*

*extending means extending rearwardly from each side of said frame means;*

*and latch means supported solely on said extending means for releasably connecting said dethatching unit to the pushing means.*

*60. A pushed dethatching apparatus for moving through grass and removing thatch material from a layer of thatch on the ground in which grass grows and including:*

*frame means;*

*wheel means attached to said frame means to support said frame means;*

*a plurality of independently movable tines mounted on said frame means, each of said tines having a lower portion for engaging thatch material to be thatched;*

*means for supporting said frame means and for attaching said frame means to a pushing means to enable pushing of said dethatching apparatus through the grass and over the ground;*

*said lower portion of each of said tines having a tip supported above the ground so that no weight is applied to said tines when said dethatching apparatus is at rest;*

*and each of said tines extending downwardly from said frame means and being movable upon engagement with grass when said apparatus is pushed therethrough, the engagement of each of said tines with the grass deflecting said lower portion and tip of said tine to engage thatch material to be thatched, each of said tines flipping the thatched material up from a layer of thatch on the ground during further forward movement of said apparatus.*

* * * * *

UNITED STATES PATENT AND TRADEMARK OFFICE

CERTIFICATE OF CORRECTION

PATENT NO. : Re. 32,551

DATED : December 1, 1987

INVENTOR(S) : Charles W. Doering

It is certified that error appears in the above-identified patent and that said Letters Patent is hereby corrected as shown below:

Column 2, line 29, after "requiring" insert -- a relatively --.

Column 5, line 10, after "and" insert -- nuts--.

Column 10, line 7, cancel "said" (first occurrence) and substitute -- and --.

Column 10, lines 39-42 should be italized.

Column 11, line 49, "said tines extending downwardly" should start a new paragraph.

Column 13, line 24, "dethatcing" should read -- dethatching --.

Column 13, lines 55-57 should be italized.

Signed and Sealed this

Thirty-first Day of May, 1988

*Attest:*

*Attesting Officer*

DONALD J. QUIGG

*Commissioner of Patents and Trademarks*